United States Patent
Duch

(10) Patent No.: US 11,578,802 B2
(45) Date of Patent: Feb. 14, 2023

(54) SEALING UNIT FOR WHEEL HUB GROUPS

(71) Applicant: Aktiebolaget SKF, Gothenburg (SE)

(72) Inventor: Daniele Duch, San Gillio (IT)

(73) Assignee: AKTIEBOLAGET SKF

( * ) Notice: Subject to any disclaimer, the term of this patent is extended or adjusted under 35 U.S.C. 154(b) by 112 days.

(21) Appl. No.: 16/985,501

(22) Filed: Aug. 5, 2020

(65) Prior Publication Data

US 2021/0041025 A1 Feb. 11, 2021

(30) Foreign Application Priority Data

Aug. 5, 2019 (IT) .................. 102019000013914

(51) Int. Cl.
  *F16J 15/3256* (2016.01)
  *F16J 15/3204* (2016.01)

(52) U.S. Cl.
  CPC ....... *F16J 15/3256* (2013.01); *F16J 15/3204* (2013.01); *F16C 2326/02* (2013.01)

(58) Field of Classification Search
  CPC .... F16J 15/00; F16J 15/16; F16J 15/50; F16J 15/52; F16J 15/32; F16J 15/3204; F16J 15/3208; F16J 15/3216; F16J 15/322; F16J 15/324; F16J 15/3252; F16J 15/3256; F16C 226/00; F16C 226/02
  USPC ......................................................... 277/341
  See application file for complete search history.

(56) References Cited

U.S. PATENT DOCUMENTS

| 5,890,812 A * | 4/1999 | Marcello ............. F16C 33/7879 384/148 |
| 2016/0245340 A1* | 8/2016 | Kaiser ................. F16C 33/7863 |
| 2018/0186181 A1* | 7/2018 | Tada .................... F16J 15/3232 |

FOREIGN PATENT DOCUMENTS

| JP | 2008014384 | 1/2008 |
| WO | 20100013439 | 2/2010 |
| WO | 2015064400 | 5/2015 |

OTHER PUBLICATIONS

International Search Report for corresponding Italian Patent Application No. 102019000013914 dated May 27, 2020.

* cited by examiner

*Primary Examiner* — Nathan Cumar
(74) *Attorney, Agent, or Firm* — Reed Smith LLP

(57) ABSTRACT

Sealing unit for a wheel hub group for vehicles that is provided with a roller bearing interposed between a rotary hub for a wheel of the vehicle, and a stationary pin of an upright of said vehicle, the sealing unit in turn comprising an annular pre-cavity arranged in an axially frontal position of the roller bearing, a dynamic portion in rotation about an axis when in use, and a static portion cooperating with the dynamic portion to protect the roller bearing from external contaminants, the dynamic portion having a centrifuging surface formed on a free end of the hub and the static portion in turn having a stationary screen that is fitted onto the support pin inside the pre-cavity and that has a centrifuging section facing the centrifuging surface to facilitate expulsion and drainage of contaminants out of the annular pre-cavity.

12 Claims, 1 Drawing Sheet

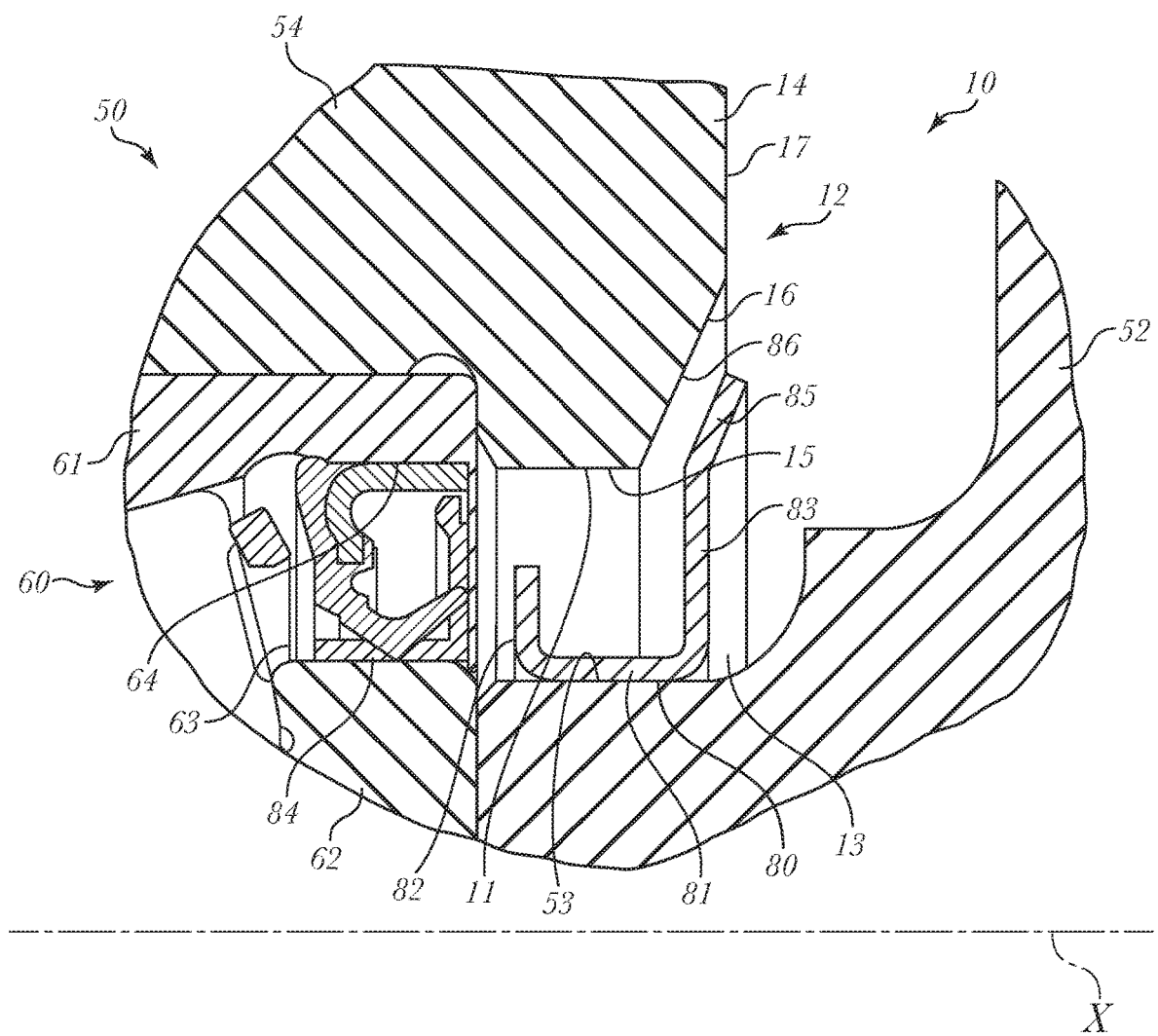

SEALING UNIT FOR WHEEL HUB GROUPS

CROSS REFERENCE TO RELATED APPLICATION

This application is based on and claims priority under 35 U.S.C. § 119 to Italian Application No. 102019000013914, filed Aug. 5, 2019, the entire contents of which are incorporated herein by reference.

DESCRIPTION

Field

The present invention relates to a sealing unit for wheel hub groups.

Background

Roller bearings in vehicle wheel hub groups require effective protection from external contaminants such as water, mud and dust, such rolling bearings being interposed between an external flanged support hub and a support pin of an upright of the vehicle.

SHORT DESCRIPTION OF THE DRAWINGS

The invention is described below with reference to the attached FIGURE, which provides a schematic view of a preferred embodiment of the invention by way of non-limiting example with portions in section and portions removed for clarity.

DETAILED DESCRIPTION

To date, effective protection of vehicle wheel hub units from external contaminants such as water, mud and dust, such rolling bearings being interposed between an external flanged support hub and a support pin of an upright of the vehicle has been obtained using a sealing unit including a rigid frame connected to the wheel hub and one or more dynamic elastic sealing lips, which are supported by the rigid frame and are in sliding contact with the support pin or with a spacer carried by the support pin. When in use, this pin is stationary and carried by the shock absorbers of the vehicle.

However, the production costs of the solution described above are somewhat high, since not only do the dynamic elastic sealing lips need to be produced by vulcanization on the rigid frame, but the support pin, or the aforementioned spacer carried by the support pin, also requires mechanical surface finishing machining in a contact zone that contacts elastic sealing lips to limit the wear thereof.

With reference to FIG. 1, reference sign 10 denotes the sealing unit for a wheel hub group 50 including a roller bearing 60 as a whole, said roller bearing being interposed between an external flanged support hub 54 for a wheel of a vehicle (not shown) and a support pin 52 of an upright of the vehicle. The pin 52 and the flanged hub 54 are both part of the group 50 and if the pin 52 is stationary when in use, the flanged hub 54 can rotate about a central axis X of rotation and symmetry of the group 50 and of the sealing unit 10. The roller bearing 60 includes an outer ring 61 that is rigidly connected to the hub 54, an inner ring 62 that is rigidly connected to the pin 52, and a sealing device 63 arranged in a cavity 64 formed between the outer ring 61 and the inner ring 62 to prevent the external contaminants, such as water, mud and dust, from entering the roller bearing 60.

Given that the environments in which the wheel hub group 50 is used are particularly aggressive in terms of contaminants, to provide even more effective protection for the roller bearing 60 against such external contaminants, the sealing unit 10 is efficiently arranged, according to the present invention, in series and in an axially frontal position of the sealing device 63 such as to reduce the presence of mud in contact with the sealing device 63 itself, and such as to efficiently drain any liquid contaminants that have come into contact with the sealing device 63 out of the roller bearing 60.

According to the present invention, the sealing unit 10 includes an annular pre-cavity 11 that is defined by the outer flanged hub 54 and the pin 52, and is arranged in series and in an axially frontal position of the cavity 64, and two portions 12 and 13, in which the portion 12 is a dynamic portion arranged to rotate about the axis X when in use, while the portion 13 is a static portion and cooperates with the dynamic portion 12 to obtain the benefits of the unit 10, as set out above.

According to the attached figure, the dynamic portion 12 includes:
- a cylindrical free end 14 of the hub 54 extending towards the pin 52, and
- two lateral surfaces 15 and 16 of the free end 14, in which the surface 15 is an internal radial cylindrical surface of the free end 14 and delimits the annular pre-cavity 11 radially outwards, while the surface 16 is a conical centrifuging surface that is inclined in relation to the axis X such that the cone shape thereof is open towards the pin 52 and on the side opposite the roller bearing 60. The surface 16 is contiguous with the surface 15 and is delimited axially on the portion opposite the surface 15 by an annular surface 17 transverse to the axis X that axially delimits the cylindrical free end 14 of the hub 54.

According to the present invention, the static portion 13 includes a rigid annular screen 80 fitted to the pin 52 along a cylindrical assembly surface 53 that radially faces the surface 15 and delimits the annular pre-cavity 11 radially inwards. The annular screen 80 comprises four sections arranged about the axis X:
- a fitting section 81 fitted to the surface 53 to rigidly connect the screen 80 and the pin 52 at a given angle, or to hold the screen 80 stationary,
- a first flanged section 82 and a second flanged section 83 that are parallel to one another, transverse to the axis X, arranged axially on opposite sides of the section 81 and rigidly connected thereto, in which the first section 82 is radially shorter than the second section 83, forming an annular window 84 with the surface 15 leading to the sealing device 63, while the second section 83 extends radially outwards over a radial length substantially equal to a dimension of a diameter D of the surface 15, and finally,
- a centrifuging section 85 that extends from the second section 83 in a position facing the conical surface 16, has substantially the same cone shape as the conical surface 16 and extends outwards from the annular pre-cavity 11 to an axial edge of the surface 17 to define, with the conical surface 16, a conical gap 86 that communicates the annular pre-cavity 11 with the outside of the sealing unit 10.

In the present invention, both the combination of the rotational movement of the hub 54 about the axis X with the centrifuging section 85, and the combination of the rotational movement of the hub 54 about the axis A with the fitting section 81 in conjunction with the first and second flanged sections 82 and 83 are of particular importance. Indeed, when in use, the rotation of the hub 54 about the axis A causes the centrifuging of any contaminants having penetrated the inside of the annular pre-cavity 11 towards the surface 15, and the shape of the centrifuging section 85, which as described above mirrors the shape of the surface 16, facilitates expulsion and draining of the contaminant from the annular pre-cavity 11 through the gap 86, the shape of which specifically determined by the centrifuging section 85 and by the surface 16 best exploits the centrifugal action of the rotation of the hub 54. It should be noted that this centrifugal action occurs over the entire surface 16, i.e. 360° about the axis A with notable advantages in terms of drainage and cleaning.

In this innovative arrangement, the surface 15 cooperates with the surface 16 to expel contaminants out of the gap 86 by centrifuging, encouraging the contaminants to move gradually towards the surface 16 as a result of rotation about the axis A and contact with the contaminant. In other words, the surface 15 can be understood to be a pre-centrifuging surface working with the centrifuging surface 16 to effectively expel and drain the contaminants from the pre-cavity 11.

Furthermore, the combination of the fitting section 81 and the first and second flanged sections 82 and 83 give the rigid screen 80 a substantially "U" shape that is open towards the surface 15 and this arrangement, in combination with the rotation of the surface 15, enables turbulence to be created within any contaminants present in the pre-cavity 11, or inside said "U" shape, thereby not only facilitating further migration of the contaminants towards the surface 15 and the expulsion thereof through the gap 86, but also preventing the contaminants from coming into contact with the sealing device 63, greatly improving the service life of the sealing device 63 and the roller bearing 60.

It is obvious from the foregoing that adoption of a simple rigid annular screen 80 combined with a simple mechanical machining of the free cylindrical end 14 of the hub 54 to obtain the conical surface 16 provide a sealing unit 10 that occupies decidedly less axial space and that is easy and economical to produce. The synergy between the dynamic action of the conical surface 16 and the cylindrical surface 15 in the area of the pre-cavity 11, and the static action of the annular screen 80, in particular the centrifuging section 85, enable an effective and reliable sealing and protection action on the roller bearing 60 that is maintained over time and does not suffer from wear in any element, as can however occur in the presence of dynamic elastic sealing lips. Finally, using a simple annular screen 80 mounted on the pin 52 not only ensures very easy assembly, and potentially disassembly, of the sealing unit 10, but also obviates the need for any mechanical machining of the pin 52, which would however be necessary where dynamic elastic sealing lips are used.

The purpose of embodiments in accordance with this disclosure is to provide a sealing unit, in particular for wheel hub groups for vehicles, that does not have the described drawbacks and that is smaller, in particular in the axial direction; that is highly efficient and reliable over time; that is very easy to assemble and disassemble; and that is very simple and relatively cheap to produce.

Embodiments in accordance with this disclosure provide a sealing unit for wheel hub groups having the features set out in the attached claims.

In addition to the embodiments described above, numerous other variants of the invention are possible. Aforementioned embodiments should be understood to be examples and do not limit the scope, applications or possible arrangements of the invention. Indeed, although the description provided above enables the person skilled in the art to carry out the present invention at least according to one example arrangement thereof, numerous variations of the components described could be used without thereby moving outside the scope of the invention, as defined in the attached claims interpreted literally and/or according to the legal equivalents of same.

The invention claimed is:

1. A sealing unit for a wheel hub group for vehicles comprising:
    a roller bearing interposed between an outer flanged hub for a wheel of the vehicle and a support pin of an upright of said vehicle;
    an annular pre-cavity arranged in an axially frontal position of the roller bearing;
    a dynamic portion configured to rotate about an axis (X) when in use; and
    a static portion configured to cooperate with the dynamic portion to protect the roller bearing from external contaminants, wherein the dynamic portion has a centrifuging surface defined by a free end of the outer flanged hub and wherein the static portion includes a stationary screen that is fitted onto the support pin inside the pre-cavity and that has a centrifuging section facing the centrifuging surface.

2. The sealing unit of claim 1, wherein the centrifuging section and the centrifuging surface together define a conical gap that communicates the annular pre-cavity with the outside of the sealing unit or that is open to the outside of the roller bearing.

3. The sealing unit of claim 2, wherein the dynamic portion has a pre-centrifuging surface formed on a free end of the hub that cooperates with the centrifuging surface to expel and drain contaminants from the pre-cavity.

4. The sealing unit of claim 3, wherein the stationary screen is U-shaped and opens towards the pre-centrifuging surface to create turbulence within any contaminants in the pre-cavity.

5. The sealing unit of claim 4, wherein the stationary screen includes a fitting section fitted to the support pin and a first flanged section and a second flanged section extending radially from the axis (X) that form the U-shaped screen with the fitting section, wherein the first flanged section has a first radial length that is less than a second radial length of the second flanged section and is arranged axially facing the roller bearing.

6. The sealing unit of claim 5, wherein the centrifuging section is supported by the second flanged section in a position facing the centrifuging surface.

7. The sealing unit of claim 1, wherein the dynamic portion has a pre-centrifuging surface formed on a free end of the hub that cooperates with the centrifuging surface to expel and drain contaminants from the pre-cavity.

8. The sealing unit of claim 1, wherein the stationary screen is U-shaped and opens towards the pre-centrifuging surface to create turbulence within any contaminants in the pre-cavity.

9. The sealing unit of claim 1, wherein the stationary screen includes a fitting section fitted to the pin and a first flanged section and a second flanged section that form the U-shaped screen with the fitting section, wherein the first flanged section has a first radial length that is less than a second radial length of the second flanged section and is arranged axially facing the roller bearing.

10. The sealing unit of claim 1, wherein the centrifuging section is supported by a second flanged section extending axially from the axis (X) in a position facing the centrifuging surface.

11. A sealing unit for a wheel hub group for vehicles comprising:
- a roller bearing interposed between a hub for a wheel of the vehicle and a support pin of an upright of said vehicle;
- an annular pre-cavity arranged in an axially frontal position of the roller bearing;
- a dynamic portion configured to rotate about an axis (X) when in use; and
- a static portion configured to cooperate with the dynamic portion to protect the roller bearing from external contaminants, wherein the dynamic portion has a centrifuging surface formed on a free end of the hub and wherein the static portion includes a stationary screen that is fitted onto the support pin inside the pre-cavity and that has a centrifuging section facing the centrifuging surface, wherein the centrifuging section and the centrifuging surface together define a conical gap that communicates the annular pre-cavity with the outside of the sealing unit or that is open to the outside of the roller bearing, further wherein the dynamic portion has a pre-centrifuging surface formed on a free end of the hub that cooperates with the centrifuging surface to expel and drain contaminants from the pre-cavity, further wherein the stationary screen is U-shaped and opens towards the pre-centrifuging surface to create turbulence within any contaminants in the pre-cavity, further wherein the stationary screen includes a fitting section fitted to the pin and a first flanged section and a second flanged section that form the U-shaped screen with the fitting section, wherein the first flanged section has a first radial length that is less than a second radial length of the second flanged section and is arranged axially facing the roller bearing.

12. A sealing unit for a wheel hub group for vehicles comprising:
- a roller bearing interposed between an outer flanged hub for a wheel of the vehicle and a support pin of an upright of said vehicle;
- an annular pre-cavity arranged in an axially frontal position of the roller bearing;
- a dynamic portion configured to rotate about an axis (X) when in use; and
- a static portion configured to cooperate with the dynamic portion to protect the roller bearing from external contaminants, wherein the dynamic portion has a centrifuging surface defined by a free end of the outer flanged hub and wherein the static portion includes a stationary screen that is fitted onto the support pin inside the pre-cavity and that has a centrifuging section facing the centrifuging surface,
- wherein the centrifuging surface extends in a radially outward direction away from the free end of a radially inner cylindrical surface defined by the outer flanged hub.

* * * * *